E. E. VALK.
OVERLOAD RELAY.
APPLICATION FILED NOV. 21, 1917.
1,347,767.
Patented July 27, 1920.
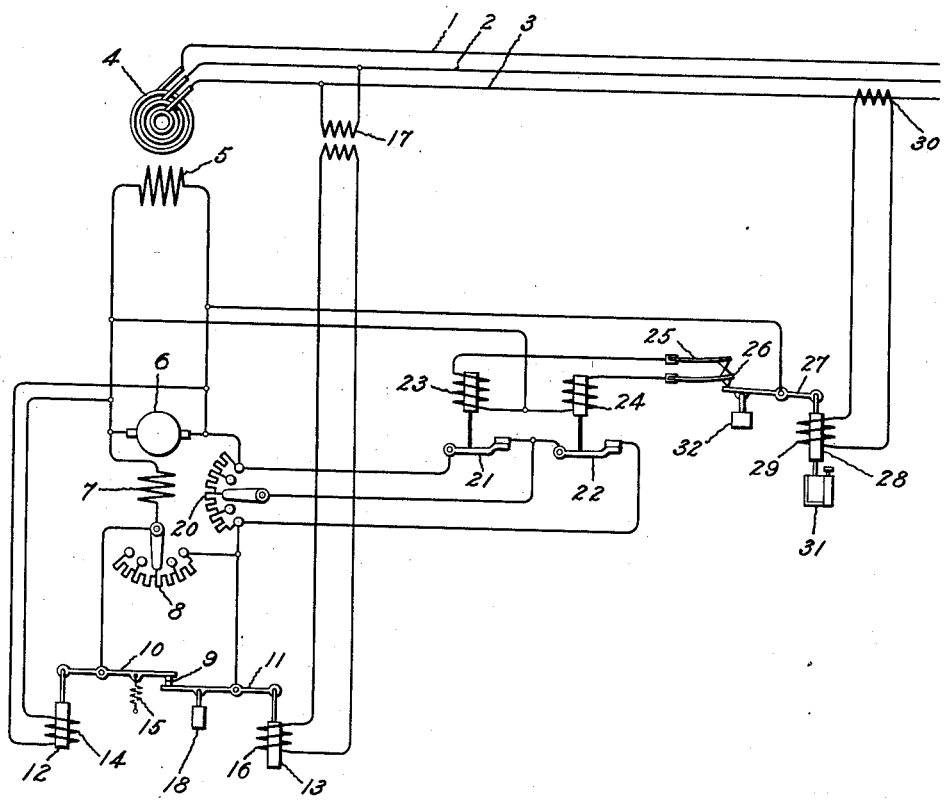
Inventor:
Eugene E. Valk,
by
His Attorney.

UNITED STATES PATENT OFFICE.

EUGENE E. VALK, OF LOS ANGELES, CALIFORNIA, ASSIGNOR TO GENERAL ELECTRIC COMPANY, A CORPORATION OF NEW YORK.

OVERLOAD-RELAY.

1,347,767.

Specification of Letters Patent. Patented July 27, 1920.

Application filed November 21, 1917. Serial No. 203,065.

*To all whom it may concern:*

Be it known that I, EUGENE E. VALK, a citizen of the United States, residing at Los Angeles, in the county of Los Angeles, State of California, have invented certain new and useful Improvements in Overload-Relays, of which the following is a specification.

This invention relates to systems of electrical distribution and particularly to systems supplied from synchronous generators having exciting means.

The object of this invention is to provide means for automatically decreasing the excitation, in case a fault such as a short circuit or an abnormally large demand should develop on the power supply line, to a point where the generator cannot deliver beyond a safe amount of current, thereby permitting the circuit breakers to remain closed and permitting continuous service though at reduced voltage.

A further object of this invention is to provide means for restoring the excitation to normal in a plurality of steps during an appreciable time interval when the fault has been cured, thereby avoiding the creation of surges in the line.

For a more complete understanding of the nature and objects of this invention reference should be had to the following detailed description, taken in connection with the accompanying drawing which discloses one embodiment of my invention in diagrammatic fashion.

Referring now to the drawings 1, 2 and 3 denote three phase supply mains furnished with current from the synchronous generator 4 having its field winding 5 energized by the exciting dynamo electric machine 6.

This machine has a shunt field winding 7 in whose circuit there is inserted the adjustable regulating resistance 8, adapted to be cut into and out of the exciter field circuit by some form of automatic voltage regulator such for instance as that disclosed in the patent to Tirrill 725,800 and here shown as comprising a pair of floating contacts 9 for shunting this resistance as voltage conditions may require. The contacts 9 are carried by a pair of levers 10 and 11 actuated respectively by the plungers 12 and 13.

The plunger 12 is attracted by the electromagnetic winding 14 connected across the terminals of machine 6, the pull of winding 14 on lever 10 being opposed by spring 15.

The plunger 13 is lifted by the electromagnetic winding 16 connected across a pair of the supply mains, preferably through a potential transformer 17. The weight of plunger 13 is arranged to be counterbalanced to any desired extent by a weight or shot pot such as shown at 18.

In addition to the regulating resistance 8 in the circuit of the exciter field winding 7, I have placed therein the resistance 20. This resistance 20 is divided into two or more parts, (two being shown by way of illustration) each part being arranged to be shunted out of the exciter field circuit by a contactor, such as I have shown at 21 and 22.

The contactors 21 and 22 have electromagnetic windings 23 and 24 respectively which, when energized, retain the contactors in closed position. The windings 23 and 24 are placed in parallel across any suitable source of electric energy such as the terminals of the exciter, their circuits being closed by the flexible contact members 25 and 26 respectively.

These contact members 25 and 26 are placed adjacent each other and, when unflexed, are in the open circuit position but are arranged to be flexed, first one then the other, to closed circuit position by the pivoted lever 27 normally drawn into engagement therewith by the weight of magnetically actuated plunger 28.

The actuating winding 29 for plunger 28 is energized in response to the current flowing in one of the supply mains and is shown as connected thereto through the current transformer 30.

This winding is so designed however that when normal current is flowing, it has not strength enough to lift the plunger 28 and move the lever 27 out of engagement with contact members 25 and 26 but only when abnormally large currents flow.

The movements of the plunger 28 are regulated by a retarding device or dash pot 31, the piston of which is connected to the lower end of the plunger in such a manner as to permit free upward movement of the plunger but retards downward movement thereof, so that an appreciable time interval elapses during the downward movement. The pull of the plunger 28 on lever 27 is counterbalanced by a convenient weight or shot pot 32.

The operation of this invention is as follows:

Assuming that the synchronous generator 4 is running and excited to furnish full load current to the mains 1, 2 and 3; this current flowing in the mains will energize winding 29 but not sufficiently to induce strength enough to lift plunger 28. The plunger 28, in consequence, holds the lever 27 in engagement with contact members 25 and 26 which are thereby flexed to complete circuits energizing windings 23 and 24 which hold the contactors 21 and 22 in closed circuit position thereby cutting out the two portions of resistance 20 from the exciter field circuit and enabling the voltage regulator to function in the usual manner by cutting regulating resistance into the exciter field circuit when the voltage tends to rise and vice versa.

Suppose now that a short circuit or other abnormal demand for current from generator 4 occurs, the rush of current will energize winding 29 to sufficient strength to raise the plunger 28 quickly and move lever 27 out of engagement with contact members 25 and 26 permitting them to unflex and break both the circuits thereby deënergizing windings 23 and 24 at practically the same instant.

When windings 23 and 24 are deënergized the contractors 21 and 22 open, cutting the whole of resistance 20 into the exciter field circuit.

The excitation of generator 4 is thus automatically reduced to a point where it cannot deliver beyond a safe amount of current into the fault, thereby counteracting the tendency of the voltage regulator to increase the excitation by reason of the drop in voltage due to the sudden rush of current.

When the fault is found and the abnormal demand for current ceases, the magnetization of winding 29 will decrease to a point where it can no longer sustain the weight of plunger 28. This plunger will then slowly descend due to the retarding action of the dash pot 31, drawing lever 27 into engagement, with contact member 26, whereby the winding 24 is first energized to close contactor 22 and cut out one portion of resistance 20 from the exciter field circuit, and, at a later instant, when the contact member 26 has been sufficiently flexed to engage contact member 25, the winding 23 is then energized to cut out the other portion of resistance 20.

The excitation of generator 4 is thus brought back to normal in two successive steps thereby avoiding a sudden increase in the generator voltage which would tend to induce the voltage to shoot up to normal values and thereby give rise to surges in the line.

While I have here shown and described what is at present the best embodiment of my invention known to me, I would have it understood that this is merely illustrative and that I do not mean to be limited to the exact details shown nor in the choice of recognized equivalents except as set forth in my claims hereunto appended.

What I claim as new and desire to secure by Letters Patent of the United States is:

1. The combination with an electrical distribution system, of a generator for supplying current thereto, means for exciting said generator, means responsive to an abnormal electrical condition of said generator for decreasing the excitation of said generator, and means for automatically restoring said excitation in a plurality of steps during an appreciable time interval after said electrical condition becomes normal.

2. The combination with an electrical distribution system, of a generator for supplying current thereto, an exciter therefor, means responsive to an abnormal electrical condition of said generator for inserting a resistance in the exciter field circuit, and means for successively cutting out portions of said resistance during an appreciable time interval after said electrical condition becomes normal.

3. The combination with electrical supply mains, of a synchronous generator for feeding current thereto, an exciter therefor, means for instantly inserting a resistance in the exciter field circuit when the current in said mains rises abnormally and means for successively cutting out portions of said resistance through a definite time interval when the current becomes normal.

4. The combination with electrical supply mains, of a synchronous generator for feeding current thereto, an exciter therefor, an exciter field circuit having a resistance in series therewith, a plurality of contactors normally shunting portions of said resistance out of said field circuit, means responsive to abnormal rises of current in said mains for instantly opening said contactors and means for causing said contactors to close successively during an appreciable time interval when the current becomes normal.

5. The combination with electrical supply mains, of a synchronous generator for feeding current thereto, an exciter therefor, an exciter field circuit having a resistance in series therewith, a plurality of contactors normally shunting portions of said resistance out of said field circuit, circuits including the actuating electromagnetic windings of said contactors and normally closed contact members in series with said windings, and means responsive to abnormal rises of current in said mains for opening all said contact members at substantially the same instant having a retarding device whereby said contact members are closed successively throughout an appreciable time interval when the current becomes normal.

6. The combination with electrical supply mains, of a synchronous generator for feeding current thereto, an exciter therefor, an exciter field circuit having a resistance in series therewith, a plurality of contactors normally shunting portions of said resistance out of said field circuit, circuits including the actuating windings of said contactors and flexible contact members in series therewith for closing and energizing said circuits, a magnetically actuated plunger normally retaining said contact members in closed position, a winding energized in response to the current flowing in said mains so as to move said plunger to open said contact members when the current rises to abnormal values and a dash pot connected to said plunger in a manner permitting said plunger to open said contact members quickly but requiring an appreciable lapse of time to complete the closing movement.

In witness whereof I have hereunto set my hand this 13th day of November, 1917.

EUGENE E. VALK.